Nov. 9, 1948.    H. B. DE VORE    2,453,414
SYSTEM FOR DIRECTING RADIO WAVES
Filed June 9, 1944
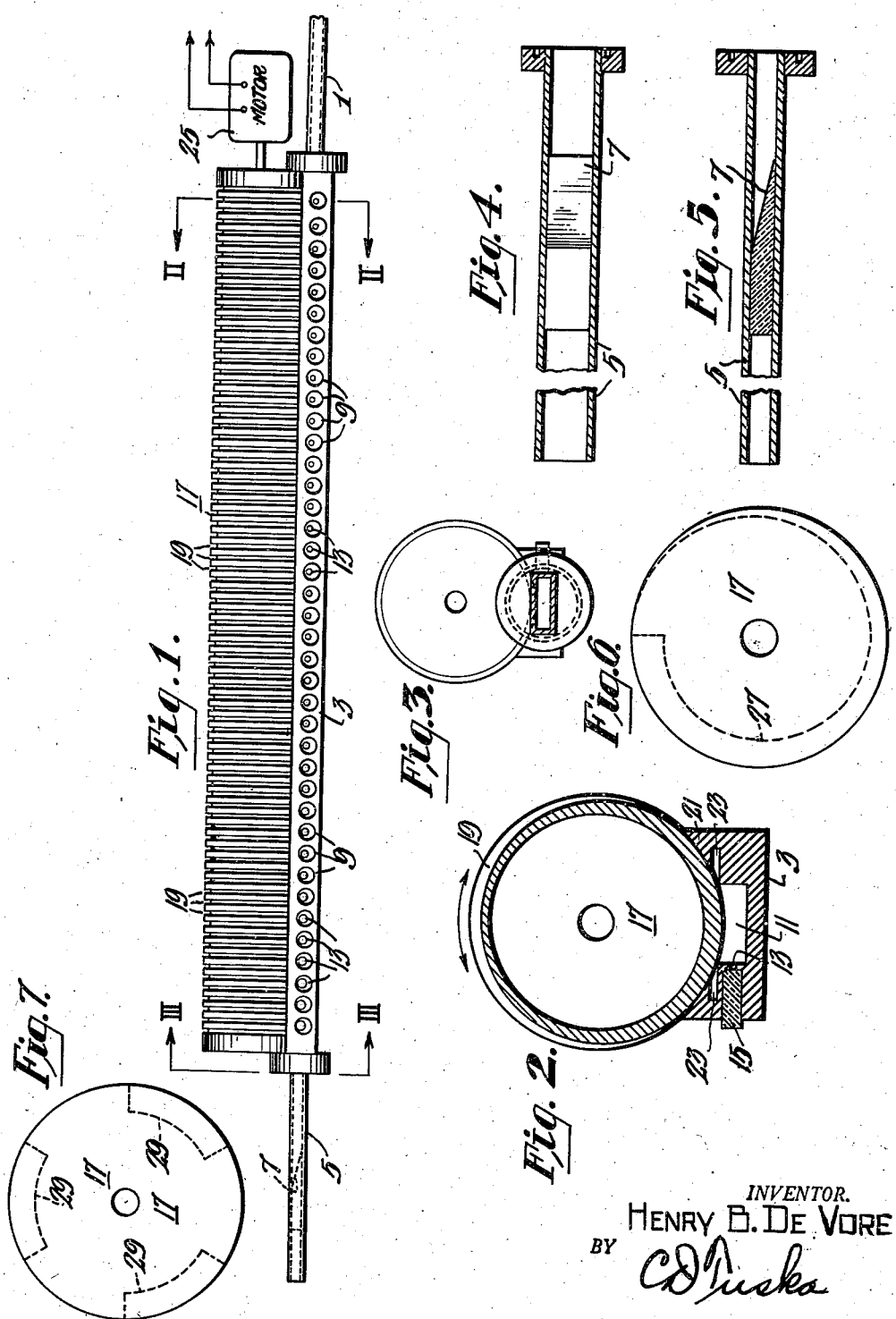
INVENTOR.
HENRY B. DE VORE
BY
*C. D. Tuska*
ATTORNEY Patented Nov. 9, 1948

2,453,414

UNITED STATES PATENT OFFICE 2,453,414

SYSTEM FOR DIRECTING RADIO WAVES

Henry B. De Vore, Cranbury, N. J., assignor to Radio Corporation of America, a corporation of Delaware Application June 9, 1944, Serial No. 539,542

10 Claims. (Cl. 250—33.63)

This invention relates to a radio system for propagating a beam of radio waves and for directing said beam through a predetermined angle, and more particularly to a system in which the energy applied to a wave guide is radiated through a plurality of radiating elements spaced along one of the sides of the wave guide and in which the phase of the radiated energy is varied by changing the effective wave length of the energy within the guide.

Numerous systems have been proposed for directing a beam of radio frequency energy throughout a predetermined angle. Such systems generally involve directive antennas which are oscillated back and forth or relatively complicated means for varying the phase of the radiated energy whereby the beam is directed throughout the required angle.

According to the present invention, the mechanical movement required to direct variably a beam of radio frequency energy is simplified. In a preferred embodiment of the invention, the effective wave length of the energy within a wave guide is varied so that the energy is radiated in different phase from a plurality of radiating apertures disposed along the edge of the wave guide. The phase changes which correspond to changes in direction of the beam are brought about by a single rotatable member which is disposed along an open side of the wave guide.

One of the objects of the instant invention is to provide a simplified system for propagating a beam of radio waves and for directing said beam through a predetermined angle. Another object is to provide an improved wave guide in which the effective wave length of the applied energy may be varied either continuously or in discrete steps. A further object is to provide an improved system for radiating radio waves through a plurality of aligned radiators in a wave guide in which the effective cut-off frequency is decreased so that the radiating energy is not attenuated in the apertures and in which the waves may be directed through a continuously varied range of angles.

The invention will be described by referring to the accompanying drawings in which Figure 1 is an elevational view of one embodiment of the invention; Figure 2 is a sectional view taken along the line II—II of Figure 1; Figure 3 is a view partly in section taken along the line III—III of Figure 1; Figures 4 and 5 are sectional views of a wave reflection reducing element of the wave guide; and Figures 6 and 7 are end views of modifications of the rotatable cylindrical member of Fig. 1.

Referring to Figure 1, a rectangular wave guide 1 is connected to a source of radio frequency energy which is to be applied to the wave guide. The wave guide 1 is suitably coupled to a wave guide section 3. The wave guide section 3 is terminated in a wave guide section 5 in which a wedge 7 of suitable material is inserted to minimize wave reflections. The details of the reflection minimizing means are more clearly illustrated in Figures 4 and 5.

The central portion of the wave guide includes a plurality of apertures 9 which terminate in the wave guide opening 11 through smaller apertures 13. The size of the smaller aperture 13 is chosen in accordance with the desired characteristics of the radiated beam. For example, in one preferred form of the invention the apertures are made increasing in size such that the same percentage of the initial wave energy is radiated as the wave is propagated from the beginning of the wave guide 3 to its termination in elements 5, 7. This gives the sharpest possible beam. In another form of the invention, the apertures near the center of the wave guide are made larger so as to radiate more energy than those at the ends of the wave guide, so that the distribution of radiated energy across the beam is such as to give, from known antenna theory, a principal beam nearly free from side lobes. The apertures preferably include a dielectric member 15 which is designed to increase the effective wave length which will be passed by the apertures 9 to avoid the attenuation which would take place if the cut-off frequency of the apertures 9 were unchanged.

One side of the wave guide member 3 is open so that it is adapted to receive the rotatable cylinder 17. The rotatable cylinder includes a plurality of parallel grooves or channels 19. The effective depth of the grooves varies from zero to nearly one quarter of the applied wave length. The width of the grooves is preferably less than one quarter of the wave length of the applied energy. The grooves are spaced preferably less than one quarter of the wave length. The outer surface of the rotatable cylinder 17 is journalled in the side walls 21 of the wave guiding member 3 which is shaped to receive the rotatable cylinder. A pair of quarter wave slots 23 are machined in the side walls 21 to increase the effectiveness with which the rotatable member closes off the open side of the wave guide.

In the operation of the system, the rotatable cylinder 17 is preferably connected to a motor such as 25 which rotates the cylinder so as to deflect the beam of radio waves at the desired frequency. While the energy applied through the wave guide 1 is of constant frequency, its effective wave length is varied by the change in the wage guide brought about by the change in the depth of the grooves 19. As the depth of the grooves changes, the wave length changes, so that the relative phases of the waves radiated through successive openings 13 and apertures 9 changes. The change in phase is progressive as the wave proceeds throughout the wave guiding member 3. Thus the resulting wave front forms an angle with respect to the line through the apertures 9. In this manner the energy radiating through the apertures 9 forms a beam which is oscillated back and forth through a predetermined angle. Choice of suitable dimensions for this system is determined by the following considerations. If the radiating apertures are spaced at a uniform distance $d$ apart, the waves radiated from the separate apertures will reenforce in such a way as to form a beam of radiation inclined at an angle $\theta$ to the normal to the wave guide length such that sin $$\theta = \frac{\lambda_0}{d}\left(\frac{d}{\lambda_g} - 1\right)$$

where $\lambda_0$ is the wave length of the radiation in free space and $\lambda_g$ is the effective wave length in the wave guide. $\lambda_g$ in turn is determined by the dimensions of the wave guide and of the grooves in the rotating cylinder. An exact expression is very difficult to evaluate. An approximation, valid for the case of a wide wave guide and for a grooved cylinder having large radius may be obtained as follows: If the spacing between the smooth wall of the wave guide and the grooved surface opposite is X, the depth of grooves is L, and the ratio of groove width to the center spacing of the grooves is R, then the wave length $\lambda_g$ in the guide will be $$\lambda_g = \frac{2\pi}{k_1}$$

where $$k_1^2 = \frac{4\pi^2}{\lambda_0^2} + k_2^2$$

and $k_2$ is determined by the equation:

$$\frac{2\pi L}{\lambda_0} \tan \frac{2\pi L}{\lambda_0} = \frac{L}{RX}(k_2 X) \tanh (k_2 X)$$

In the specific example of Fig. 2 the bottom of the groove 19 is circular and is tangent with the rotatable cylinder 17. In this arrangement, the resulting beam is directed back and forth at a non-uniform rate through two sweeps for each rotation of the cylinder at a uniform rate. It should be understood that the sweep rate may be made uniform by a suitable variation in the groove depth. The beam may be made to sweep once per rotation of the grooved cylinder by arranging the grooves in the form of a plurality of single turn spirals 27 of the type shown in Fig. 6. Moreover, the beam may be deflected stepwise into two or more positions by rotating continuously a cylinder grooved as indicated by the channels 29 in Fig. 7.

While the invention has been described with particular reference to its use and operation as a transmitter, the system may be used for reception or for both transmission and reception. It should be understood that the claims are intended to either system and either use.

I claim as my invention:

1. A system for propagating a beam of radio waves and for directing said beam through a predetermined angle including a wave guide having a plurality of radiating elements and having an open side, means for applying radio frequency energy to one end of said wave guide; and a rotatable member, including a plurality of grooves, disposed along said wave guide to close its open side and to alter the effective wave length of the energy within said guide as a function of the depth of said grooves.

2. A system for propagating a beam of radio waves and for directing said beam through a predetermined angle including a wave guide having a plurality of apertures of different openings and having an open side, means for applying radio frequency energy to one end of said wave guide; and a rotatable member, including a plurality of grooves, disposed along said wave guide to close its open side and to alter the effective wave length of the energy within said guide as a function of the depth of said grooves.

3. A system for propagating a beam of radio waves and for directing said beam through a predetermined angle including a wave guide having a plurality of apertures of different openings and having an open side, means for decreasing the effective cutoff frequency of said openings, means for applying radio frequency energy to one end of said wave guide; and a rotatable member, including a plurality of grooves, disposed along said wave guide to close its open side and to alter the effective wave length of the energy within said guide as a function of the depth of said grooves.

4. A system for propagating a beam of radio waves and for directing said beam through a predetermined angle including a wave guide having a plurality of apertures of different openings and having an open side, means for applying radio frequency energy to one end of said wave guide; a rotatable member, including a plurality of grooves, disposed along said wave guide to close its open side and to alter the effective wave length of the energy within said guide as a function of the depth of said grooves; and means for minimizing the reflections from the other end of said wave guide.

5. A system for propagating a beam of radio waves and for directing said beam through a predetermined angle including a wave guide having a plurality of radiating elements and having an open side, means for applying radio frequency energy to one end of said wave guide; a rotatable member, including a plurality of grooves, disposed along said wave guide to close its open side and to alter the effective wave length of the energy within said guide as a function of the depth of said grooves; and means for minimizing the reflections from the other end of said wave guide.

6. A system for propagating a beam of radio waves and for directing said beam through a predetermined angle including a wave guide having a plurality of apertures of different openings and having an open side, means for decreasing the effective cut-off frequency of said openings, means for applying radio frequency energy to one end of said wave guide; a rotatable member, including a plurality of grooves, disposed along said wave guide to close its open side and to alter the effective wave length of the energy within said guide as a function of the depth of said grooves; and means for minimizing the reflections from the other end of said wave guide.

7. A system for propagating a beam of radio waves and for directing said beam through a predetermined angle including a wave guide, said wave guide including a plurality of openings and a plurality of radiating elements and having an open side, means for decreasing the effective cut-off frequency of said openings, means for applying radio frequency energy to one end of said wave guide; a rotatable member, including a plurality of grooves, disposed along said wave guide to close its open side and to alter the effective wave length of the energy within said guide as a function of the depth of said grooves; and means for minimizing the reflections from the other end of said wave guide.

8. A system for propagating a beam of radio waves and for directing said beam through a predetermined angle including a wave guide having a plurality of radiating apertures of different openings and having an open side normal to the plane of polarization of the radiation passing through said wave guide, dielectric means for increasing the effective cut-off valve length of said apertures, means for applying radio frequency energy to one end of said wave guide, a rotatable cylindrical member disposed to close substantially the open side of said wave guide and including a plurality of parallel circumferential grooves having depths varying from zero to nearly one quarter of the applied wave length and having widths less than one quarter of the applied wave length whereby said grooves are exposed to said applied radio frequency energy to alter its effective wave length as a function of said groove depth, and means for minimizing the leakage of energy between said guide and said rotatable means.

9. A system for propagating a beam of radio waves and for directing said beam through a predetermined angle including a wave guide having a plurality of radiating elements and having an open side normal to the plane of polarization of the radiation passing through said wave guide, means for applying radio frequency energy to one end of said wave guide, a rotatable cylindrical member disposed to close substantially the open side of said wave guide and including a plurality of parallel channels disposed in portions of the cylindrical member defined by radial planes and having predetermined radial depths whereby said channels are exposed to said applied radio frequency energy to alter its effective wave length as a function of said groove depth, and means for minimizing the leakage of energy between said guide and said rotatable means.

10. A system according to claim 8 in which the said grooves are of substantially spiral form.

HENRY B. DE VORE.

REFERENCES CITED

The following references are of record in the file of this patent:

UNITED STATES PATENTS

| Number | Name | Date |
| --- | --- | --- |
| 1,301,644 | Buckley | Apr. 22, 1919 |
| 1,562,961 | Heising | Nov. 24, 1925 |
| 2,247,662 | Newhouse | July 1, 1941 |
| 2,206,923 | Southworth | July 9, 1940 |

FOREIGN PATENTS

| Number | Country | Date |
| --- | --- | --- |
| 23,155/35 | Australia | June 22, 1936 |